(12) United States Patent
Medwick et al.

(10) Patent No.: US 7,736,750 B2
(45) Date of Patent: Jun. 15, 2010

(54) COATED NON-METALLIC SHEET HAVING A BRUSHED METAL APPEARANCE, AND COATINGS FOR AND METHOD OF MAKING SAME

(75) Inventors: Paul A. Medwick, Glenshaw, PA (US); James P. Thiel, Pittsburgh, PA (US); Gary J. Marietti, Cheswick, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 678 days.

(21) Appl. No.: 11/639,003

(22) Filed: Dec. 14, 2006

(65) Prior Publication Data
US 2008/0145661 A1    Jun. 19, 2008

(51) Int. Cl.
*B32B 17/06* (2006.01)
(52) U.S. Cl. ............... 428/542.2; 428/432; 428/433; 428/141; 428/142; 428/209; 428/543; 428/913.3
(58) Field of Classification Search ............... 428/543, 428/542.2, 913.3, 141, 142, 195.1, 209
See application file for complete search history.

(56) References Cited

U.S. PATENT DOCUMENTS

| | | | |
|---|---|---|---|
| 3,083,551 A | 4/1963 | Pilkington | |
| 3,220,816 A | 11/1965 | Pilkington | |
| 3,660,061 A | 5/1972 | Donley et al. | |
| 3,843,346 A | 10/1974 | Edge et al. | |
| 4,111,150 A | 9/1978 | Donley et al. | |
| 4,379,040 A | 4/1983 | Gillery | |
| 4,514,582 A * | 4/1985 | Tiedje et al. | 136/256 |
| 4,719,126 A | 1/1988 | Henery | |
| 4,719,127 A | 1/1988 | Greenberg | |
| 4,746,347 A | 5/1988 | Sensi | |
| 4,806,220 A | 2/1989 | Finley | |

(Continued)

FOREIGN PATENT DOCUMENTS

DE      102004040043 B3 *   3/2006

(Continued)

OTHER PUBLICATIONS

PCT International Search Report dated Aug. 6, 2008 for International Application No. PCT/US2007/086088 filed Nov. 30, 2007.*

*Primary Examiner*—Gwendolyn Blackwell
(74) *Attorney, Agent, or Firm*—Andrew C. Siminerio (57) ABSTRACT

An article includes a substrate, e.g. a glass sheet having a first major surface and an opposite second major surface having a textured surface to provide a predetermined pattern on the second surface of the substrate, and an overlay, e.g. a coating over the pattern. The percent of visible light transmittance, and percent visible light reflectance, of the substrate and the overlay is selected such that the pattern is visible when the article is viewed through one of the surfaces of the substrate or overlay. In one non-limiting embodiment, the substrate is glass and the article has a metallic appearance. In another non-limiting embodiment, the overlay is a transparent coating deposited on the second surface of the glass sheet into grooves of the pattern. Other non-limiting embodiments include the substrate having a Delta % haze of greater than 15%, and a protective overcoat over the coating.

15 Claims, 5 Drawing Sheets

U.S. PATENT DOCUMENTS

| | | | |
|---|---|---|---|
| 4,853,256 A | 8/1989 | Obringer et al. | |
| 4,861,669 A | 8/1989 | Gillery | |
| 4,898,789 A | 2/1990 | Finley | |
| 4,900,633 A | 2/1990 | Gillery | |
| 5,030,592 A | 7/1991 | Komarneni et al. | |
| 5,240,886 A | 8/1993 | Gulotta et al. | |
| 5,593,929 A | 1/1997 | Krumwiede et al. | |
| 5,792,559 A | 8/1998 | Heithoff et al. | |
| 5,873,203 A | 2/1999 | Thiel | |
| 5,964,962 A * | 10/1999 | Sannomiya et al. | 136/256 |
| 6,027,766 A | 2/2000 | Greenberg et al. | |
| 6,510,708 B1 * | 1/2003 | Boot et al. | 65/61 |
| 6,548,192 B2 | 4/2003 | Chen | |
| 6,589,661 B2 | 7/2003 | Neely, Jr. | |
| 6,869,644 B2 | 3/2005 | Buhay et al. | |
| 6,916,542 B2 | 7/2005 | Buhay et al. | |
| 6,962,759 B2 | 11/2005 | Buhay et al. | |
| 2003/0031842 A1 * | 2/2003 | Marietti et al. | 428/195 |
| 2003/0037569 A1 | 2/2003 | Arbab et al. | |
| 2003/0180547 A1 * | 9/2003 | Buhay et al. | 428/434 |
| 2003/0224181 A1 * | 12/2003 | Finley et al. | 428/432 |
| 2005/0016583 A1 * | 1/2005 | Blieske et al. | 136/256 |
| 2005/0123772 A1 * | 6/2005 | Coustet et al. | 428/432 |

FOREIGN PATENT DOCUMENTS

| | | | |
|---|---|---|---|
| DE | 102205041242 A1 * | 3/2007 | |
| EP | 0456488 A1 * | 11/1991 | |
| EP | 0536607 A2 * | 4/1993 | |
| EP | 1424315 A1 | 6/2004 | |
| JP | 60-86056 A | 5/1985 | |

* cited by examiner

COATED NON-METALLIC SHEET HAVING A BRUSHED METAL APPEARANCE, AND COATINGS FOR AND METHOD OF MAKING SAME

BACKGROUND OF THE INVENTION

1. Field of the Invention

This invention relates to a coated non-metallic sheet having a brushed metal appearance, and coatings for, and method of making, the coated non-metallic sheet, and more particularly, to a glass sheet having a textured surface, and a coating applied over the textured surface to provide a coated sheet having a brushed metal appearance.

2. Discussion of the Present Technology

Metal sheets having a textured surface (hereinafter also referred to as "textured metal sheets") have a striking and eye catching appearance which makes them desirable for use as part of the interior and exterior decor of buildings, in the manufacture of furniture, and in the manufacture of appliances. Although the textured metal sheets have acceptable appearance, there are drawbacks. For example and not limiting to the discussion, the textured metal sheets are opaque, excluding their use for transparent areas where viewing and/or transmitting visible light is desired. Another drawback is that the textured metal sheets are expensive, and still another drawback is that the exposed textured surface can be scratched and/or dented detracting from the textured pattern on the metal surface.

As is appreciated by those skilled in the art, it would be advantages to provide a coated non-metallic sheet or article having a textured metal appearance without having the drawbacks of the presently available textured metal sheets.

SUMMARY OF THE INVENTION

This invention relates to an article having a substrate and an overlay. The substrate has a first major surface and an opposite second major surface, the second major surface having a textured surface to provide the second surface of the substrate with a predetermined pattern. The overlay has a first surface and an opposite second surface with the first surface of the overlay in surface contact with the textured surface to conform portions of the first surface of the overlay to corresponding portions of the predetermined pattern, wherein percent visible light transmittance, and percent visible light reflectance, of the substrate having the overlay is selected such that the predetermined pattern is visible when the article is viewed through the first surface of the substrate, or is visible when the article is viewed through the second surface of the overlay.

In one non-limiting embodiment of the invention, the overlay is a magnetically sputtered vacuum deposited transparent coating including an aesthetic reflective layer of one or more metals, metal alloys and mixtures thereof, optionally the coating includes a primer layer over the aesthetic reflective layer, a dielectric layer over the primer layer and a protective overcoat over the dielectric layer.

In another non-limiting embodiment of the invention, the overlay is a heatable coating having a low emissivity and includes a base layer of a visible light absorbing material over one of the surfaces of the substrate, preferably on the second surface of the substrate; a first dielectric layer over the base layer; a first silver layer over the first dielectric layer; a first primer layer over the first silver layer; a second dielectric layer over the first primer layer; a second silver layer over the second dielectric layer; a second primer layer over the second silver film; a third dielectric layer over the second primer layer; and a protective overcoat over the dielectric layer. The coated article has color coordinates according to the CIE 1976 standard with illuminant D65 at a 10% observer angle of a*=0.3, b*=4.5, and L*=78, wherein the listed color coordinates can vary by ±10%.

In another non-limiting embodiment of the invention, the overlay comprises a first sub-layer and a second sub-layer, the first sub-layer is the first surface of the overlay and the first sub-layer having an opposite second surface, the second sub-layer is the opposite second surface of the overlay and an opposite first surface with the first surface of the second sub-layer in facing relationship to the second surface of the first sub-layer. The first surface of the layer has a visible light transmission of greater than 0% and the second sub-layer has a visible light transmission of 0% and visible light reflectance of the first surface of the layer is greater than the visible light reflectance of the substrate such that the predetermined textured pattern is visible to the unaided eye through the first surface, and not through the second surface, of the substrate.

In still another non-limiting embodiment of the invention, the substrate includes a first layer and a second layer, the first layer having the first major surface of the substrate and an opposite second surface, and the second layer having the second surface of the substrate and an opposite first surface with the first surface of the second layer in facing relationship to the second surface of the first layer, the second layer of the substrate having a visible light transmission of 0% and the overlay has a visible light transmission of greater than 0% such that the predetermined textured pattern is visible with the unaided eye through the second major surface of the overlay.

Other embodiments of the article of the invention include the substrate and the overlay each have a visible light transmission of greater than 0% and further comprising a transparent sheet and a spacer edge assembly to maintain the transparent sheet and the second surface of the overlay in facing spaced relationship to one another; the substrate and the overlay each have a visible light transmission of greater than 0% and further comprising a transparent sheet and an interlayer sheet to secure the transparent sheet to the second surface of the overlay, and the textured surface is selected from a plurality of wiggly lines spaced from one another, a plurality of spaced cross hatch areas, a series of broken arcs that spiral to a center area, one contiguous bent line that spirals to a the center area, a concave surface, a plurality of spaced circular depressions, a plurality of raised surfaces, a plurality of spaced convex portions, one convex portion, and combinations thereof.

Non-limiting embodiments of the article include articles of manufacture selected from furniture, appliances, windows for commercial and residential buildings, and a vehicle part; windows for commercial and residential windows comprising the overlay spaced from and in facing relationship to a protective sheet and a compartment between the overlay and the protective sheet, and a transparency for a vehicle comprising a transparent protective sheet laminated to the overlay.

The invention further relates to a method of making an article that exhibits a metallic appearance by treating a surface of a non-metal substrate to provide a predetermined pattern on the textured surface of the substrate; and applying an overlay over the textured surface of the substrate, wherein percent visible light transmittance of the substrate having the overlay, and percent visible light reflectance of the substrate having the overlay is selected such that the predetermined pattern is visible when the article is viewed through one of outer surfaces of the article.

The invention still further relates to a coating having an aesthetic reflective layer of one or more metals, metal alloys and mixtures thereof; a primer layer over the aesthetic reflective layer; a dielectric layer over the primer layer and optionally a protective overcoat over the dielectric layer. Although not required, the coating can be a heatable coating.

In one non-limiting embodiment of the coating, the optically reflective film has a thickness in the range of 1 to 20 nanometers ("nm"); the primer layer is on the aesthetic reflective layer and has a thickness of 1 to 10 nanometers ("nm"); the dielectric film is on the primer layer and has a thickness in the range of 1 to 10 nm and the protective overcoat is on the dielectric layer and having a thickness in the range of 10 to 500 nm.

Other non-limiting embodiments of the coating include the aesthetic reflective layer selected from the group of steel, copper, brass, niobium, aluminum, nichrome, tin, nickel, and chrome, noble metals and mixtures thereof, and the primer film selected from the group of titanium containing material, a zirconium containing material, an aluminum containing material, a nickel containing material, a chromium containing material, a hafnium containing material, a copper containing material, a niobium containing material, a tantalum containing material, a vanadium containing material, an indium containing material, a zinc containing material, and mixtures thereof; the dielectric layer is selected from the group of oxides of titanium, hafnium, zirconium, niobium, zinc, bismuth, lead, indium, tin, zinc and tin, oxides of indium-tin alloys, silicon nitrides, silicon aluminum nitrides, oxynitrides, and aluminum nitrides, and the protective layer is an oxide of a mixture of silica and alumina The invention additionally relates to heatable coating having a low emissivity, the coating includes a layer of a visible light absorbing material; a first dielectric layer over the layer of the visible light absorbing material; a first silver layer over the first dielectric layer; a first primer layer over the first silver layer; a second dielectric layer over the first primer layer; a second silver layer over the second dielectric layer; a second primer layer over the second silver film; a third dielectric layer over the second primer layer; and optionally a protective overcoat over the dielectric layer. The coating has color coordinates according to the CIE 1976 standard with illuminant D65 at a 10% observer angle of $a^*=0.3$, $b^*=4.5$, and $L^*=78$, wherein the listed color coordinates can vary by ±10%.

In other non-limiting embodiments of the coating, the layer of the visible light absorbing material has a thickness in the range of 2 to 10 nanometers ("nm"); the first dielectric layer is on the layer of visible light absorbing material and has a thickness in the range of 30 to 50 nm; the first silver layer is on the first dielectric layer and has a thickness in the range of 10 to 100 nm; the first primer layer is on the first silver layer and has a thickness in the range of 1 to 6 nm; the second dielectric layer is on the first primer layer and has a thickness in the range of 30 to 50 nm; the second silver layer is on the second dielectric layer and has a thickness in the range of 10 to 100 nm; the second primer layer is on the second silver layer and has a thickness in the range of 1 to 6 nm; a third dielectric layer is on the second primer layer and has a thickness in the range of 30 to 50 nm; and a protective overcoat is on the third dielectric layer and has a thickness in the range of 10 to 500 nm; and the visible light absorbing material is selected from the group of titanium nitride, nickel, chrome, and mixtures thereof.

BRIEF DESCRIPTION OF THE DRAWING

FIG. 3 includes FIGS. 3A-3D, 3F and 3H which are elevated front views of non-limiting embodiments of textured surfaces that can be used in the practice of the invention.

DETAILED DESCRIPTION OF THE INVENTION

As used herein, spatial or directional terms, such as "inner", "outer", "left", "right", "up", "down", "horizontal", "vertical", and the like, relate to the invention as it is shown in the drawing figures. However, it is to be understood that the invention can assume various alternative orientations and, accordingly, such terms are not to be considered as limiting. Further, all numbers expressing dimensions, physical characteristics, and so forth, used in the specification and claims are to be understood as being modified in all instances by the term "about". Accordingly, unless indicated to the contrary, the numerical values set forth in the following specification and claims can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 6.7, or 3.2 to 8.1, or 5.5 to 10. Also, as used herein, the terms "deposited over", "applied over", or "provided over" mean deposited, applied, or provided on but not necessarily in surface contact with. For example, a material "deposited over" a substrate does not preclude the presence of one or more other materials of the same or different composition located between the deposited material and the sheet or substrate.

Before discussing non-limiting embodiments of the invention, it is understood that the invention is not limited in its application to the details of the particular non-limiting embodiments shown and discussed herein since the invention is capable of other embodiments. Further, the terminology used herein to discuss the invention is for the purpose of description and is not of limitation. Still further, unless indicated otherwise in the following discussion, like numbers refer to like elements.

The use of the coated non-metallic sheet of the invention having a textured metal appearance is not limiting to the invention and can be used to make any article of manufacture including but not limited to furniture, e.g. but not limited to table tops, counter tops, windows for cabinets and doors; to appliances, e.g. but not limited to oven doors, refrigerator doors, clock faces; to windows for commercial and residential buildings, and to uses in vehicle applications, e.g. but not limited to recreational vehicle windows, and automotive roof, side, front and rear windows.

Figure 1:
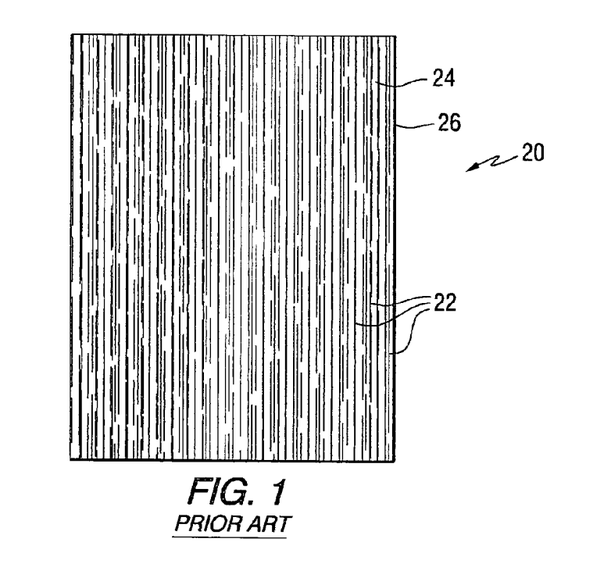
FIG. 1 is an elevated front view of a brushed metal sheet of the prior art.

Shown in FIG. 1 is a prior art textured metal sheet or textured metal article 20. The textured metal article 20 includes scratches or grooves 22 of varying depth, width and length imposed in major surface 24 of metal sheet 26 to provide the textured metal appearance to the article 20 in accordance to the teachings of the prior art. The metal sheet 26 is any metal, e.g. stainless steel, copper or aluminum, and in one embodiment of the prior art, the metal is stainless steel, and the textured metal surface 24 is optionally a polished surface or an unpolished surface.

Figure 2:
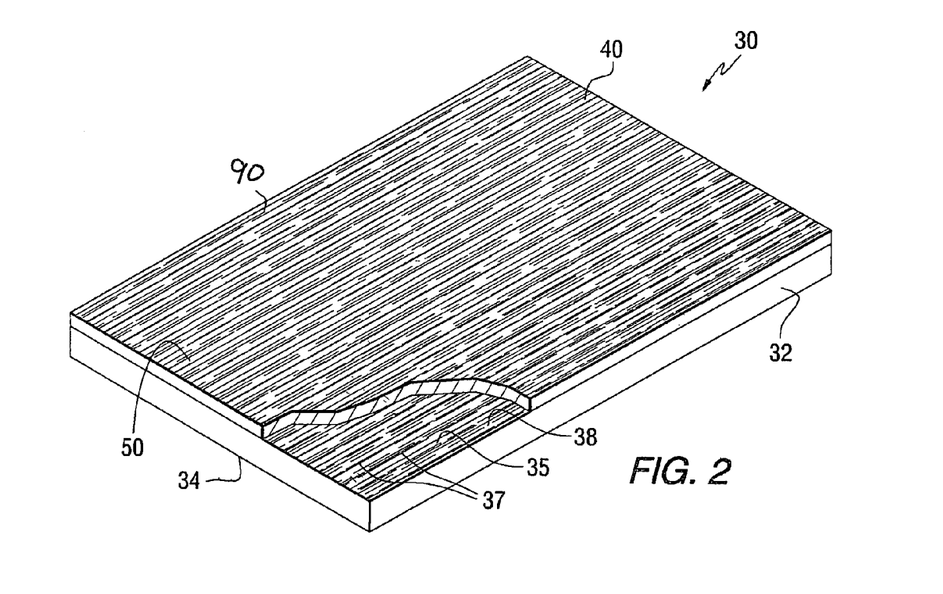
FIG. 2 is an isometric view having portions removed for purposes of clarity of a non-limited embodiment of a coated article of the invention having a brushed metal appearance.

Shown in FIG. 2 is one non-limiting embodiment of a coated textured non-metallic article of the invention designated by the number 30; the article 30 has a textured metal appearance in accordance to the teachings of the invention. More particularly, the coated textured non-metallic article 30 includes a non-metallic sheet or substrate 32 having a first major surface 34 and an opposite second major surface 35. The second major surface 35 has a plurality of raised surface portions and/or scratches or grooves 37 of varying depth, width, length, height and/or shape imposed in and/or on the second major surface 35 of the sheet 32 to provide the major surface 35 with a textured appearance. For ease of discussion, the second major surface 35 having the raised portions and/or grooves 37 is also referred to as "textured surface 38." A non-limiting embodiment of an overlay or coating 40 of the invention is applied over the textured surface 38. The article 30 under discussion has a visible light transmission greater than 0%. As used herein, the term "visible light" means wavelengths of the electromagnetic spectrum in the range of 380-780 nanometers. However, it should be appreciated that other non-limiting embodiments of the invention include a coating 40 that has 0% visible light transmission, i.e. the coating is opaque.

The sheet or substrate 32 of the article 30 can be made of any material that has a visible light transmission greater than 0%. Materials that can be used in the practice of the invention for the sheet 32 include, but are not limited to, any type of plastic that is transparent to visible light, e.g. and not limited to polymeric materials, polycarbonate, acrylic and polyethylene terephthalate, and any type of glass that is transparent to visible light, e.g. and not limited to ceramic materials, glass-ceramic materials, glass materials e.g. but not limiting to the invention soda-lime-silicate glass, borosilicate glass, or any type of refractory glass and combinations thereof. The glass and plastic can be clear or tinted, and can be made in any manner.

In a preferred non-limiting embodiment of the invention, the sheet 32 is a glass sheet. Tinted glass sheets can be used in the practice of the invention and include, but are not limited to the types disclosed in U.S. Pat. Nos. 5,030,592; 5,240,886; 5,593,929, and 5,792,559, the disclosures of the patents are hereby incorporated by reference. The glass sheet can be annealed glass, tempered glass, or heat strengthened glass. In another non-limiting embodiment of the invention, the glass is made by float glass processes, e.g. but not limited to the float glass processes disclosed in U.S. Pat. Nos. 3,083,551; 3,220,816, and 3,843,346, which disclosures are hereby incorporated by reference. In another non-limiting embodiment of the invention, the sheet 32 is a soda-lime-silicate glass sheet of the type sold by PPG Industries, Inc. under the registered trademark Starphire®.

Still further, the sheet 32 can be a monolithic sheet or a laminate, e.g. two sheets of the same or different materials, e.g. but not limiting to the invention, glass and plastic joined together by an interlayer material. In addition, the major surfaces 34 and 35 of the sheet 32 can have one or both major surfaces 34 and 35 flat or curved, or one major surface flat and the other major surface curved, and/or the spaced apart major surfaces 34 and 35 can be parallel to each other or at least a portion of one major surface can be angularly offset from the other major surface.

The discussion is directed to the textured surface 38 of the sheet 32. The term "textured surface" as used herein means that the angle of incidence of a collimated beam of light impinging and moving over a portion of a textured surface has an angle of reflection different from the angle of incidence. The invention is not limited to any particular design or predetermined pattern of the textured surface. As used herein, the term "predetermined pattern" is not limited to any particular design and includes both regular and random patterns. In addition, it can be appreciated that the predetermined pattern can include linear and/or nonlinear lines and/or line segments. For example, and not limiting to the invention, the grooves 37 can be similar in shape and design to the grooves 22 of the textured metal plate 20 of FIG. 1. For example and not limiting to the invention, the grooves 37 shown in FIG. 2 can have a length up to 5 centimeters ("cm"), for example up to 1 cm, a width ranging from 1-100 microns, for example from 10-20 microns with the width of the grooves varying between ends of the grooves, and a depth ranging from 0.05-1 microns, for example from 0.1-0.2 microns, with the depth varying between the ends of the grooves. Shown in FIG. 3, are other non-limiting embodiments of textured surface that can be used in the practice of the invention.

Figure 3A:
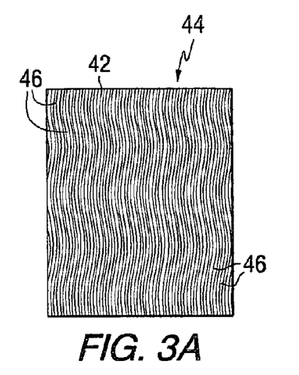
Figure 3B:
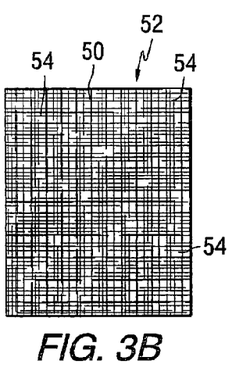
Figure 3C:
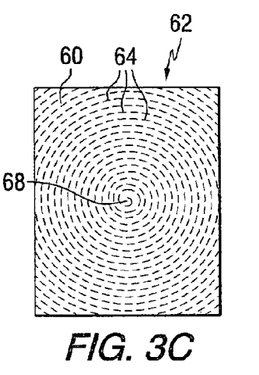
Figure 3D:
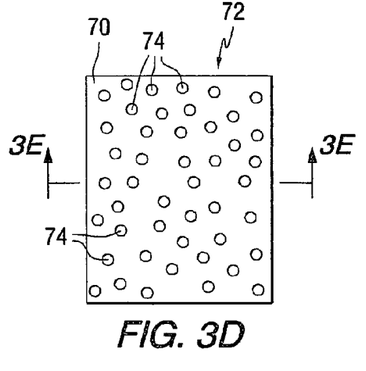
Figure 3E:
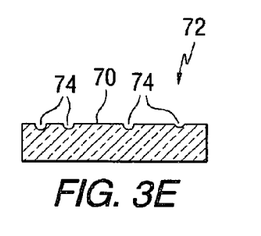
FIGS. 3E and 3G are views taken along lines 3E of FIG. 3D and lines 3G of FIG. 3G, respectively.
Figure 3F:
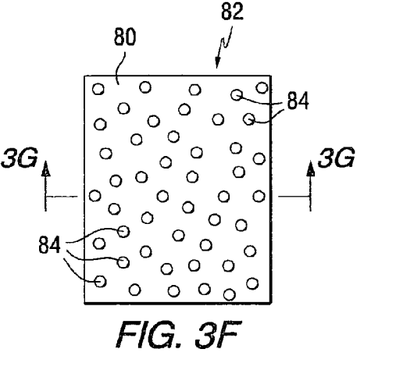
Figure 3G:
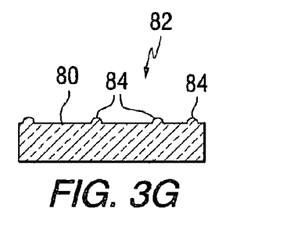
Figure 3H:
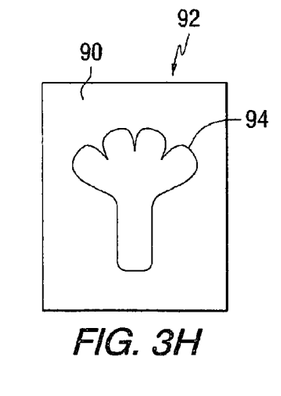

With reference to FIG. 3, textured surface 42 of sheet 44 shown in FIG. 3A includes a plurality of nonlinear grooves 46 spaced from one another. In the particular non-limiting embodiment shown in FIG. 3, the grooves 46 are generally sinusoidal in shape. Textured surface 50 of sheet 52 shown in FIG. 3B has a plurality of spaced grooves crossing one another to give a cross hatched appearance 54. As can be appreciated, the grooves can extend to opposite edges of the sheet 52 to cover the total surface area of the sheet with one cross hatch pattern as shown in FIG. 3B or with a plurality of spaced cross hatched areas (not shown). Textured surface 60 of sheet 62 shown in FIG. 3C is a series of grooves in the shape of broken arcs 64 that spiral to center 68. As can be appreciated the spiral can be one contiguous groove that spirals to the center 68. Textured surface 70 of sheet 72 shown in FIGS. 3D and 3E has one or a plurality of spaced apart depressed, or concave, surface portions 74. The depressions can have any shape, e.g. but not limiting to the invention, circular, triangular, square, rectangular or polyhedral and combinations thereof. Textured surface 80 of sheet 82 shown in FIGS. 3F and 3G includes one or a plurality of spaced apart raised, or convex, surface portions 84. The convex portions 84 can have any shape, e.g. but not limiting to the invention, circular, triangular, square, rectangular or polyhedral and combinations thereof. Textured surface 90 of the sheet 92 shown in FIG. 3H is a picture 94 of an object. The invention is not limited thereto and the picture 94 of the textured surface 90 can be a picture of a person and/or an object, e.g., topography of the earth, sky and/or planets. The textured surfaces of the invention are not limited to the non-limiting embodiment shown in FIGS. 2 and 3, and the textured surface can be combinations of the textured surfaces shown in FIGS. 2 and 3, and can be any other configuration.

In another non-limiting embodiment of the invention, the textured surface of the invention is a translucent surface, e.g. and not limiting to the invention, the major surface 35 of the sheet 32 can be acid etched or mechanically abraded to be a translucent surface. In another non-limiting embodiment of the invention at least 20%, e.g. at least 50%, or at least 80%, or at least 90%, of the total surface area of a major surface, e.g. and not limiting to the invention, the major surface 35 of the sheet 32, is textured.

In still another non-limiting embodiment of the invention, the textured surface 32 of the uncoated sheet or substrate 32 has a Delta % haze greater than 0%. The % haze is the % of light passing through the sheet. The haze measurement is made using a TCS spectrophotometer marketed by BYK-Gardner and sold under the mark HAZE-GARD. In use, a light source is positioned on the side of the sheet opposite to the side of the sheet to be textured, i.e. the light source is on the side 34 of the sheet 32 shown in FIG. 2. As is appreciated by those skilled in the art, the sheet is cleaned and dried before the measurements are taken. The Delta % haze is the difference between the % haze of a sheet prior to texturing the surface of the sheet, and after texturing the surface of the sheet.

The raised portions and/or grooves 37 can be imposed on or in the surface of the sheet, e.g. the surface 35 of the sheet 32, in any convenient manner to provide the textured surface 38. In one non-limiting embodiment of the invention, the scratches are provided by practicing the prior art process of imposing the scratches 24 in the surface 22 of the metal sheet 20. More particularly and not limiting to the invention, the sheet 32 is moved past a rotating cylinder having abrading material on selected outer surface portions of the cylinder (hereinafter also referred to as "the surface treatment step"). In another non-limiting embodiment of the invention, the scratches 37 can be imposed in the surface 35 by rubbing the substrate 32 with an abrasive slurry (i.e., grit in a liquid carrier) or an abrasive grit (i.e., grit in powder form). Suitable abrasive grits include hard materials such as silicon carbide, ceria, alumina, boron carbide and diamond. Any convenient rubbing process can be utilized. In a non-limiting embodiment of the present invention, the treating step includes brushing the sheet or substrate 32, e.g. the brushing can be accomplished using one or more Scotch-Brite® scouring pads, a pad with silicon carbide embedded in it, nylon brushes having bristles impinged with abrasive grits. Any brushing process known in the art can be utilized in the practice of the invention to provide the textured surface 38. In still another non-limiting embodiment of the invention the surface is textured using a laser or an air abrasive jet. As is appreciated by those skilled in the art, after the treatment step and prior to making the coated article, it is understood that the abraded sheet is cleaned and dried, in any convenient manner.

In another non-limiting embodiment of the invention, the surface 35 of the sheet 32 can be textured while the sheet is being manufactured, e.g. and not limiting to the invention, glass can be textured either on-line in the glass float bath, or on-line downstream of the glass float bath. For example, but not limiting to the invention, the glass can be textured using the process disclosed in U.S. Pat. No. 4,746,347, which includes passing a glass ribbon while supported on molten metal in the float bath forming chamber under a metal roll having a patterned surface, and in U.S. patent application Publication No. 2003/0037569, which includes dropping glass particles on the surface of the glass ribbon while in the float bath forming chamber. U.S. Pat. No. 4,746,347 and U.S. patent application Publication No. 2003/0037569 are hereby incorporated by reference.

The invention is not limited to the material of the coating 40 on surface 35. In one non-limiting embodiment of the invention, the coating 40 is selected to provide the coated article 30 when viewed through the surface 34 (the surface opposite the textured surface 38) with a percent of visible light reflectance greater than the percent of visible light reflectance of the sheet 32 when the sheet 32 is viewed through the major surface 34. The percent of visible light reflectance between the coated article 30 and the sheet 32 is not limiting to the invention and in one non-limiting embodiment the difference is at least 10 percent, e.g. at least 20 percent, or at least 30 percent, or at least 40 percent. The percent of visible light reflectance of the coated article when viewed through surface 90 of the coating 40 of coated article 30 is not limiting to the invention, and can be equal to, greater than, or less than, the percent of visible light reflectance of the coated article 30 when the coated article is viewed through the uncoated surface 34.

In one non-limiting embodiment of the invention, at least a portion of the surface area of the raised portions and/or grooves is covered by the coating 40 so that the surface of the coating 40 contacting the textured surface 38 is not planed, i.e. the coating at the coating 40/surface 38 interface follows the contours of the textured surface 38. In this manner, the coating reflects the pattern of the textured surface 38, and the pattern of the textured surface 38 surface can be seen by viewing the coated article. In a further non-limiting embodiment, the surface of coating 40 opposite surface 38 generally maintains the same textured surface profile as textured surface 38 of sheet 32.

In another non-limiting embodiment of the invention, at least a portion of the surface area of the raised portions and/or grooves is covered by the coating 40 such that coating 40 fills in the textured surface 38 and the surface of the coating 40 opposite the textured surface 38 presents a smooth surface. In an arrangement of this type, if the coating 40 is transparent, the article 30 will still exhibit a textured coating appearance when viewed from either side of the article. In an arrangement of this type where the coating 40 is opaque, e.g. coating 40 is a thick metal coating, the article 30 will appear opaque when viewed from the coating side and textured when viewed through sheet 32.

The coating 40 alone or in combination with the sheet 32, i.e. the coated article 30, can have any reflective color or can simulate the color of any metal, e.g. but not limiting to the invention to gold, silver, aluminum, stainless steel, copper, brass, niobium, aluminum, nichrome, tin, nickel and chrome. The aesthetic properties of the coated article 30 of the present invention will vary depending on the desired metallic appearance. For example, if the desired metallic appearance is that of steel, the coated article 30 will have different aesthetic properties than if the desired metallic appearance is that of brass.

Ranges for the aesthetic properties of the coated article according to the present invention are provided below for various metallic appearances. The aesthetic properties of the coated substrate are represented by color coordinates according to the CIE 1976 standard with illuminant D65 at a 100 observer angle. The listed color coordinates can vary by ±10% and are not limiting to the invention.

TABLE 1

Aesthetic Properties Exhibited by Coated Substrates according to the Present Invention

| Desired Metallic Appearance | a* | b* | L* |
|---|---|---|---|
| Buffed copper | 13.3 | 14.9 | 85.6 |
| Dull copper | 22.3 | 29.7 | 71.3 |
| Brass | 3.0 | 27.6 | 69.6 |
| Oxidized brass | 7.5 | 46.0 | 55.9 |
| Polished brass | 0.4 | 23.3 | 84.2 |
| Brushed stainless steel | 0.3 | 4.5 | 78.0 |
| Polished niobium | 0.6 | 2.7 | 70.1 |
| Aluminum | 0.3 | 3.4 | 83.6 |
| Dull aluminum | 0.8 | 6.3 | 79.2 |
| Nichrome | 0.5 | 5.4 | 77.1 |
| Gold | 10.8 | 35.8 | 76.2 |

The coating 40 (see FIG. 2) can be deposited using conventional deposition techniques such as chemical vapor deposition ("CVD"), spray pyrolysis, atmospheric plasma deposition and magnetron sputtered vacuum deposition ("MSVD") as are well known in the art. Suitable spray pyrolysis methods of deposition are described in the following references which are hereby incorporated by reference: U.S. Pat. Nos. 4,719,126; 4,719,127; 4,111,150; and 3,660,061. Suitable MSVD methods of deposition are described in the following references which are hereby incorporated by reference: U.S. Pat. Nos. 4,379,040; 4,861,669; and 4,900,633. Although not limiting to the invention, unless indicated other wise, the following non-limiting embodiments of coatings of the invention are applied using any type of vacuum deposition, e.g. using MSVD.

In a first non-limiting embodiment of a coating of the invention, the coating 40 is transparent to visible light, is heatable and has a reflective layer or film that passes and reflects visible light (hereinafter also referred to as "an aesthetic reflective layer"). The term "transparent to visible light" means the coating has greater than 0% transmission of visible light. The term "heatable" means the coating can be heated to a temperature above room temperature without deteriorating the layers, e.g. metal layers of the coating. The term "reflects visible light" means that the coating reflects at least some visible light. Usually for processing glass, the coating has to withstand temperatures equal to or greater than 1000° F. (538° C.), e.g. and not limiting to the invention, temperatures can be equal to or greater than 1100° F. (593° C.) for glass press bending operations, and temperatures equal to or greater than 1200° F. (649° C.) for glass tempering operations.

The non-limiting embodiment of the coating, includes an aesthetic reflective layer of one or more metals, metal alloys and mixtures thereof, having a thickness in the range of 1 to 20 nanometers ("nm"), e.g. in the range of 5 to 15 nm, provided over, and e.g. in surface contact with, the textured surface 38; a primer layer or film having a thickness in the range of 1 to 10 nm, e.g. in the range of 2 to 8 nm, provided over, and e.g. in surface contact with, the aesthetic reflective layer; a dielectric layer having a thickness in the range of 1 to 10 nm, e.g. in the range of 2 to 8 nm, provided over, and e.g. in surface contact with, the primer layer; and a protective overcoat having a thickness in the range of 10 to 500 nm, e.g. in the range of 50 to 300 nm, provided over, and e.g. in surface contact with, the dielectric layer.

The aesthetic reflective layer of a metal, metal alloy and mixtures thereof provides a surface to reflect visible light so that the coated article has a percent of visible light reflectance greater than the percent of visible light reflectance of the sheet 32 as discussed above. Suitable metals for the aesthetic reflective layer include, but are not limited to, steel (for example, grade 316 steel), copper, brass, niobium, aluminum, nichrome, tin, nickel, chrome, and noble metals, such as silver, gold, copper, platinum, iridium, osmium, and alloys and mixtures thereof. As is appreciated by those skilled in the art, the metal, metal alloy and mixtures that can be used for the aesthetic reflective layer also have the property of reflecting infrared energy, providing the above coating of the invention with infrared reflective and emissivity properties. Infrared energy is defined as wavelengths of the electromagnetic spectrum greater than 780 nm. The term "high emissivity" is defined as an emissivity equal to or greater than 0.3; an emissivity below 0.3 is considered "low emissivity." The emissivity of the coating depends on the metal selected, e.g. a silver film has a low emissivity, and a steel film has a high emissivity.

As is well known in the art, the primer layer provides protection to the aesthetic reflective layer during heating of the coating and during the deposition of the dielectric layer practicing MSVD. Suitable primer layers include oxygen-capturing or oxygen-reactive materials such as, but not limited to, a titanium containing material, a zirconium containing material, an aluminum containing material, a nickel containing material, a chromium containing material, a hafnium containing material, a copper containing material, a niobium containing material, a tantalum containing material, a vanadium containing material, an indium containing material, and a zinc containing material.

The discussion is now directed to the dielectric layer and the protective layer of the above coating. When the surface 90 of the coating 40 of the coated article 30 (see FIG. 2) is exposed, the surface 90 should be protected to prevent or reduce deterioration of the coating from cleaning solutions, touching and the atmosphere. As can be appreciated, exposed coated surfaces, in particular MSVD coated primer layers and films are generally not durable and should be protected by a hard protective coating to prevent or reduce deterioration. In one non-limiting embodiment of the invention, a protective overcoat of the type disclosed in U.S. Pat. Nos. 6,869,644 B2; 6,916,542 B2, and 6,962,759 B 2, which patents are hereby incorporated by reference, is used. In another non-limiting embodiment of the invention, the protective coating is a mixture of silica and alumina, e.g. $Si_{0.85}Al_{0.15}O_x$. Other non-limiting techniques to protect the coating 40 against deterioration are discussed below.

A silica and alumina protective overcoat can be used in the practice of the invention for MSVD coatings. One of the limitations of the protective overcoat is that during its deposition by MSVD, it chemically attacks metals; therefore, the aesthetic reflective layer and the primer layer, if present, has to be protected during the deposition of the protective overcoat. In one non-limiting embodiment of the invention, the aesthetic reflective layer is protected by the primer layer, and the primer layer is protected by the dielectric film. As can be appreciated, if the silica and alumina protective overcoat is not used in the practice of the invention and the article 30 is not heated, the coated article 30 need only include the aesthetic reflective layer, and if the silica and alumina protective overcoat is not used in the practice of the invention and the article is heated, the coated article 30 need only include the aesthetic reflective layer and the primer layer. It should be further appreciated that the primer layer should be applied over the silver layer in a manner that does not materially affect the properties of the silver. For example and not limiting in the present invention, where the primer is titanium, it can be sputter deposited over the silver in a non-reactive atmosphere and subsequently be converted to $TiO_2$ by heating the coating or sputter depositing another layer over the titanium using a reactive atmosphere.

Suitable materials that can be used for a dielectric layer includes but is not limited to metal oxides, oxides of metal alloys, nitrides, oxynitrides, or mixtures thereof. Examples of suitable metal oxides include, but are not limited to, oxides of titanium, hafnium, zirconium, niobium, zinc, bismuth, lead, indium, tin, and mixtures thereof. Additionally, the dielectric layer can include oxides of metal alloys or metal mixtures, such as, but not limited to, oxides containing zinc and tin, oxides of indium-tin alloys, silicon nitrides, silicon aluminum nitrides, oxynitrides, or aluminum nitrides. For example, the dielectric layer can include a zinc/tin alloy oxide such as "zinc stannate" which refers to a composition of $Zn_XSn_{1-X}O_{2-X}$ (Formula 1) where x is greater than 0 but less than 1. If $x=\frac{2}{3}$, for example, the zinc stannate formed would be represented by $Zn_{2/3}Sn_{1/3}O_{4/3}$ which is commonly described as "$Zn_2SnO_4$".

In a second non-limiting embodiment of a coating of the invention, the coating is a transparent, low emissivity, heatable coating having silver films that have the appearance of brushed stainless steel (see Table 1 above). More particularly, the coated article 30 has the appearance of brushed stainless steel and the infrared reflecting properties of a silver coating. The coating of the invention includes a layer of a visible light absorbing material having a thickness in the range of 2 to 10 nm, e.g. in the range of 4 to 8 nm, provided over the textured surface 38, and e.g. in surface contact with, the textured surface; a first dielectric layer having a thickness in the range of 30 to 50 nm, e.g. in the range of 37 to 44 nm, provided over, and e.g. in surface contact with, the layer of visible light absorbing material; a first silver layer having a thickness in the range of 10 to 100 nm, e.g. in the range of 30 to 100 nm, provided over, and e.g. in surface contact with, the first dielectric layer; a first primer layer having a thickness in the range of 1 to 6 nm, e.g. in the range of 2 to 4 nm, provided over, and e.g. in surface contact with, the first silver layer; a second dielectric layer having a thickness in the range of 30 to 50 nm, e.g. in the range of 37 to 44 nm, provided over, and e.g. in surface contact with, the first primer layer; a second silver layer having a thickness in the range of 10 to 100 nm, e.g. in the range of from 30 to 100 nm, provided over, and e.g. in surface contact with the second dielectric layer; a second primer layer having a thickness in the range of 1 to 6 nm, e.g. in the range of 2 to 4 nm, provided over, and e.g. in surface contact with, the second silver; a third dielectric layer having a thickness in the range of 30 to 50 nm, e.g. in the range of 37 to 44 nm, provided over, and e.g. in surface contact with, the second primer layer; and a protective overcoat having a thickness in the range of 10 to 500 nm, e.g. in the range of 50 to 300 nm, provided over, and e.g. in surface contact with, the dielectric layer.

In another non-limiting embodiment of the second coating, the first silver layer has a thickness in the range of 5 to 20 nm, e.g. 10 to 15 nm; the second silver layer has a thickness in the range of 5 to 15 nm, e.g. 10 to 12 nm; the first and second primer layers each have a thickness in the range of 1 to 6 nm, e.g. in the range of 2 to 4 nm; the first and second dielectric layers each have a thickness in the range of 20 to 40 nm, e.g. in the range of 25 to 35 nm, and the protective overcoat has a thickness in the range of 10 to 500 nm, e.g. in the range of 50 to 300 nm.

The materials of the primer layers, the dielectric layers, and the protective overcoat of the second non-limiting coating embodiment can be the same as the materials of the primer layer, the dielectric layer, and the protective overcoat of the first non-limiting coating embodiment described above.

The layer of visible light absorbing material between the silver layer and the substrate reduces the percent of visible light reflection of the silver layers when the coated article is viewed through the uncoated surface 34 (see FIG. 2). In this manner, the percent of visible light reflectance of the silver is greater when the coated article 30 is viewed through the surface 90 of the coated article than when viewed through the surface 34 of the coated article to provide the coated article 30 with the color coordinates of brushed stainless steel (see Table 1). As can now be appreciated, providing the silver layers between the substrate and a layer of visible light absorbing material will have an opposite effect, e.g. the percent of visible light reflectance of the silver layers is greater when viewed through the surface 34 than when viewed through the surface 90 of the coated article.

Materials that can be used for visible light absorbing materials include, but are not limited to titanium nitride, nickel and chrome including alloys such as nichrome sold under the trademark Inconel® alloy which is commercially available from The Special Metals Corporation (NY), and mixtures thereof.

In a non-limiting embodiment of the invention, the sheet or substrate 32 can be subjected to a heat treatment such as press bending, tempering, etc. The sheet 32 can be subjected to heat treatment after the coating 40 is applied over the textured surface 38, or the sheet 32 can be subjected to heat treatment before the coating 40 is applied over the textured surface 38.

As can be appreciated, the invention is not limited to the coating layer 40 and other coatings, e.g. the coatings disclosed in U.S. Pat. Nos. 4,806,220; 4,853,256 and 4,898,789, which disclosures are hereby incorporated by reference.

Figure 4:
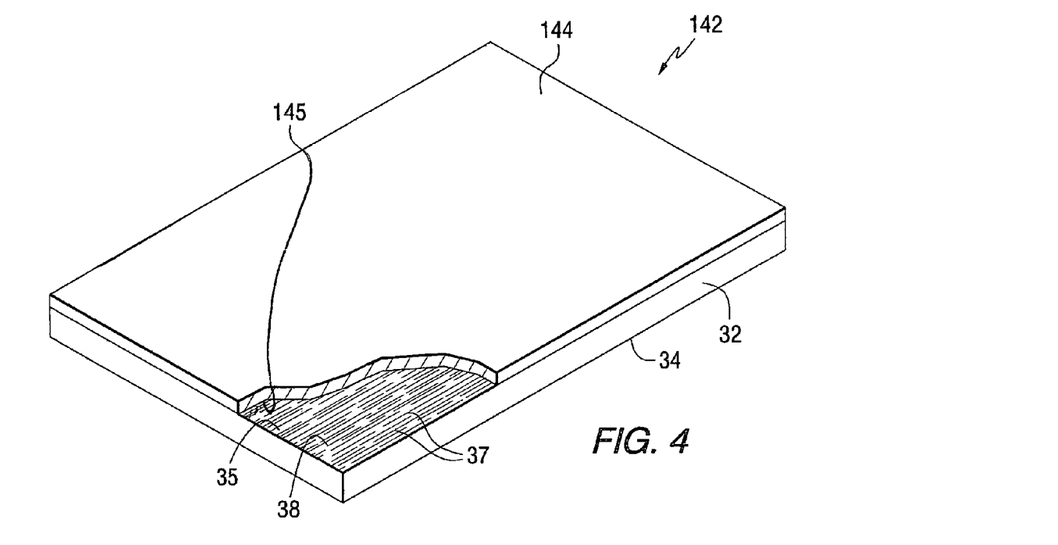
FIG. 4 is a view similar to the view of FIG. 2 showing another non-limiting embodiment of a coated article of the invention having a brushed metal appearance.

Another non-limiting embodiment of a coated article of the invention is shown in FIG. 4 and is designed by the number 142. The coated article 142 includes the sheet or substrate 32 having the textured surface 38 and an opaque layer 144 having 0% visible light transmission and having a reflective surface 145. The reflective surface 145 is over and secured to the textured surface 38, with portions of the reflective surface in the grooves of the textured surface. The percent visible light reflection of the surface 145 of the layer 144 is greater than the percent of visible light reflection of the sheet 32, to view the textured surface 38 through the surface 34.

The invention is not limited to the materials of the opaque layer 144; however, the reflective surface 145 of the opaque layer preferably conforms to the textured surface 38 as discussed above so that the textured surface is visibly observable from the uncoated surface 34 of the coated article 142. Materials for the opaque layer 144 that can be used in the practice of the invention include, but are not limited to, thick MSVD coating layers of metal, metal oxides and mixtures thereof, e.g. but not limiting the invention thereto, steel (for example, grade 316 steel), copper, brass, niobium, aluminum, nichrome, tin, nickel and chrome, titanium containing material, zirconium containing material, an aluminum containing material, a nickel containing material, a chromium containing material, a hafnium containing material, a copper containing material, a niobium containing material, a tantalum containing material, a vanadium containing material, an indium containing material. The thickness of the coated layer 144 is not limited to the invention, but has a minimum coating thickness for the coating layer 144 to have a visible light transmission of 0%.

In the instance when the opaque layer 144 is applied as a liquid coating, it can be applied in any conventional manner, e.g. by spraying, dip coating and brush application. In the instance when the opaque layer 144 is applied as a vapor or by vacuum deposition, any of the coating methods discussed above for applying the coating 40 of the coated article 30 of FIG. 2 can be used. In another non-limiting embodiment of the invention, when the opaque layer 144 is applied as a solid, e.g. the layer 144 is a metal foil; the metal foil is applied to the textured surface, e.g. by moving a roller having a pliable body over the layer, biasing the layer against the textured surface, or by using positive or negative fluid pressure, e.g. air pressure to the bias the metal foil layer against the textured surface. Optionally and not limiting to the invention, the layer 144 of metal foil can be secured against the textured surface 38 by a thin layer of adhesive transparent to visible light.

In a non-limiting embodiment, the opaque layer 144 is an opaque, visible light reflective, coating comprising the following: a layer of one or more metals, metal alloys and mixtures thereof, e.g. and not limiting to the invention having a thickness in the range of 10 to 100 nm, e.g. from 30 to 100 nm, provided over, and e.g. in surface contact with, the textured surface 38; a primer layer having a thickness in the range of 1 to 6 nm, e.g. in the range of 2 to 4 nm, provided over, and e.g. in surface contact with, the layer of one or more metals, metal alloys and mixtures thereof; a dielectric layer having a thickness in the range of 1 to 10 nm, e.g. in the range of 2 to 8 nm, provided over, and e.g. in surface contact with, the primer layer; and a protective overcoat having a thickness in the range of 10 to 500 nm, e.g. in the range of 20 to 300 nm, provided over, and e.g. in surface contact with, the dielectric layer.

The layer of one or more metals, metal alloys and mixtures thereof, the primer layer, the dielectric layer and the protective overcoat of the non-limiting embodiment of the opaque coating of the invention can use any of the materials of the layer of one or more metals, metal alloys and mixtures thereof, the primer layer, the dielectric layer and the protective overcoat of the non-limiting embodiment of the coating layers discussed above.

Figure 5:
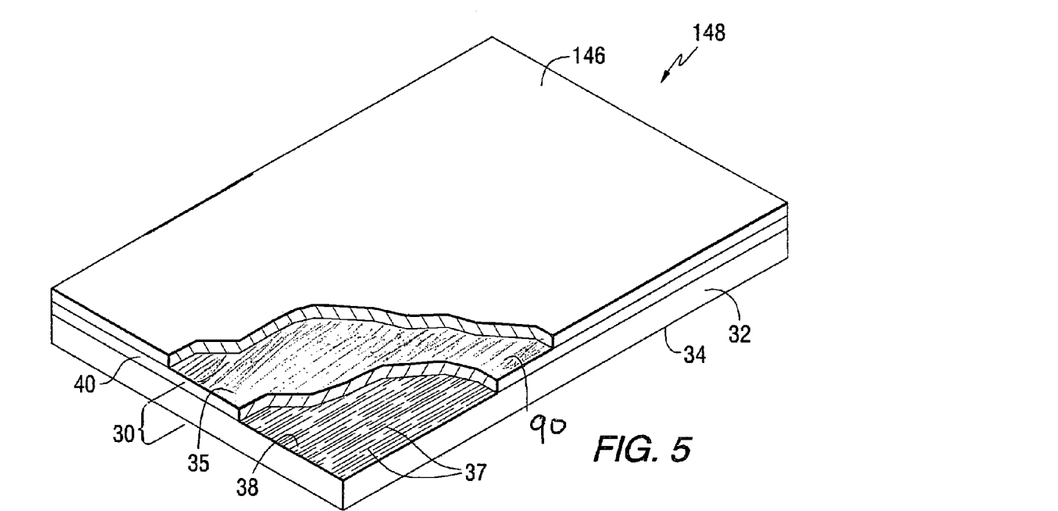
FIG. 5 is a view similar to the view of FIG. 2 showing still another non-limiting embodiment of a coated article of the invention having a brushed metal appearance.

Shown in FIG. 5 is another non-limiting embodiment of a coated article of the invention designated by the number 148. In general, the coated article 148 includes the coated article 30 (see FIG. 2) having an opaque layer 146 provided over, and e.g. secured to, outer major surface 90 of the coated article 30. As is appreciated, the coated article 148 includes the non-limited embodiments of the coated article 30 (also see FIG. 2) having an opaque layer 146 provided over, and e.g. secured t, the surface 90 of the coating 40 of the coated article 30. The invention is not limited to the material of the opaque coating 146, e.g. and not limiting to the invention, the opaque layer 146 can be a coating, e.g. the non-limiting embodiments of the opaque coating 144 of the coated article 42 of FIG. 3, a wood sheet, a metal sheet, an opaque plastic sheet, or opaque glass sheet, adhered, e.g. but not limiting to the invention, by an adhesive or by lamination to the surface 90 of the coated article 30, or a sheet transparent to visible light having an opaque coating on a surface. As can now be appreciated, the article 148 is viewed through the major surface 34 of the sheet 32 of the article 148.

Figure 6:
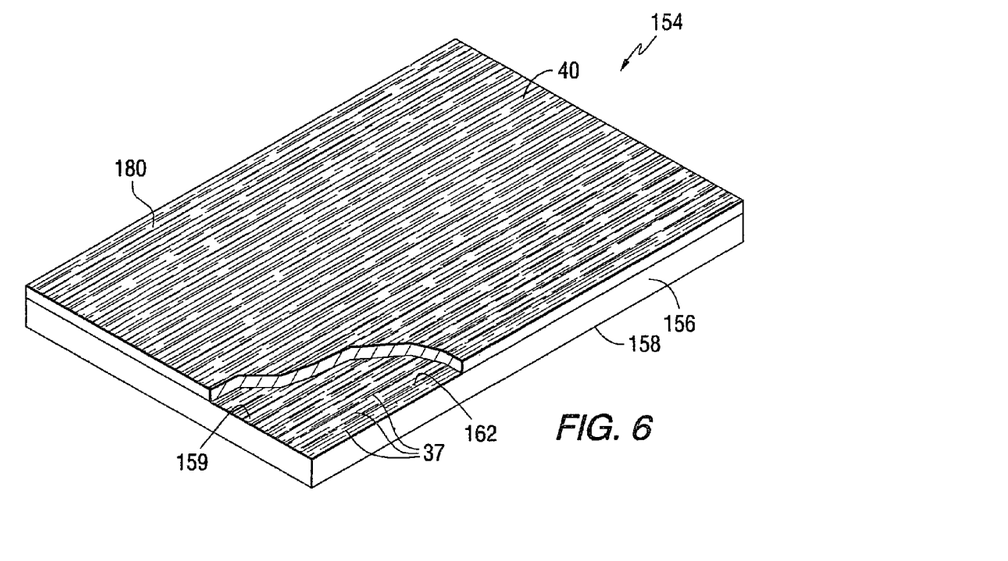
FIG. 6 is a view similar to the view of FIG. 2 showing yet another non-limiting embodiment of a coated article of the invention having a brushed metal appearance.

Shown in FIG. 6 is another non-limiting embodiment of a coated article of the invention designated by the number 154. In general, the coated article 154 includes a sheet or substrate 156 having an outer major surface 158 and an opposite inner major surface 159. The raised portions and/or grooves 37 are imposed in or on the inner major surface 159 of the sheet 156 to provide a textured surface 162. The coating 40 is provided over, and in this particular embodiment secured to, and conforms to the textured surface 162 of the sheet 156. The sheet 156 has a visible light transmission of 0%, i.e. the sheet 156 is opaque to visible light. The sheet 156 can be made of any material that is opaque, e.g. and not limiting to the invention metal, wood, any type of plastic that is opaque to visible light, e.g. and not limited to polymeric materials, polycarbonate, acrylic and polyethylene terephthalate, and any type of glass that is opaque to visible light, or a sheet of glass or plastic transparent to visible light and having a coating to make sheet opaque to visible light, e.g. and not limited to ceramic materials, glass-ceramic materials, glass materials.

The raised portions and/or grooves 37 of the textured surface 159 of the sheet 156 are imposed in the surface 159 in a manner discussed above, and thereafter, the coating 40 is applied to the textured surface 162 of the sheet 156.

Figure 7:
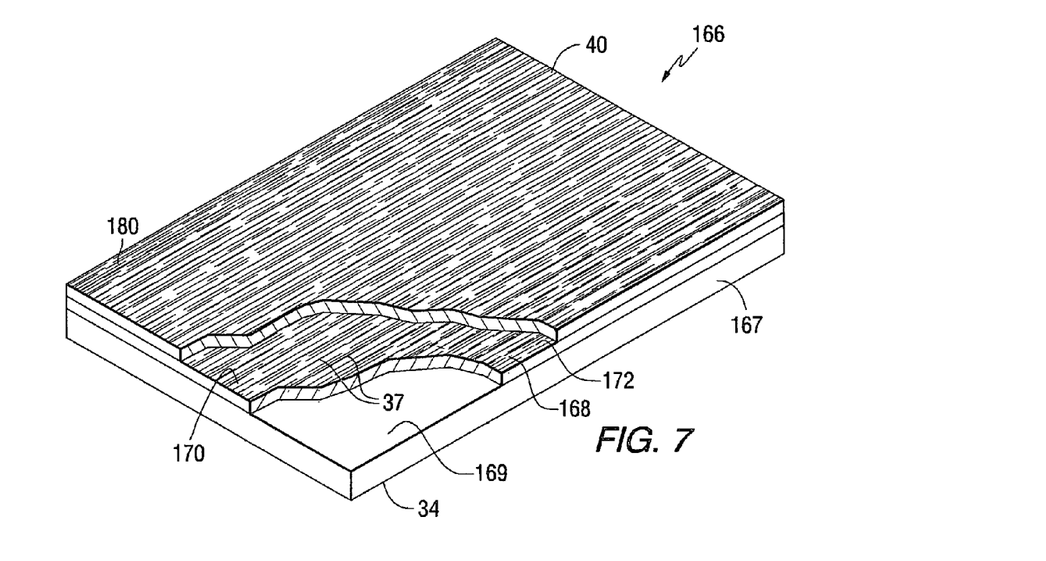
FIG. 7 is a view similar to the view of FIG. 2 showing an additional non-limiting embodiment f a coated article of the invention having a brushed metal appearance.

Shown in FIG. 7 is another non-limiting embodiment of a coated article of the invention designated by the number 166. In general, the coated article 166 includes a sheet or substrate 167 having an opaque layer 168 provided over, and in this particular embodiment secured to, major surface 169 of the sheet 167. Surface 170 of the opaque layer 168 is formed with or is subsequently processed to form the scratches or grooves and/or raised portions 37 such that the opaque layer 168 has a textured surface 172. The coating 40 is provided over, and e.g. secured to, and conforms to the abraded surface 172 of the opaque layer 168.

The sheet 167 is similar to the sheet 32 (see FIG. 2) except that the surfaces, e.g. the surface 169 of the sheet 167, do not have the textured surface 38 as does the surface 35 of the sheet 32. The opaque layer 168 is not limiting to the invention and can be any opaque layer sufficiently rigid to impose the grooves 37 and raised portions on the surface 170 to provide the textured surface 172. In one non-limiting embodiment of the invention, the sheet 167 is a glass or plastic sheet, and the layer 168 is a plastic sheet adhered to the surface 169 of the sheet 167, and in another non-limiting embodiment, the sheet 167 is a glass sheet having an opaque glass frit fired onto the surface 169. Adhering glass to plastic, plastic to plastic and glass frit to glass are well known in the art and no further discussion is deemed necessary.

The grooves and/or raise portions 37 are imposed in the surface 170 of the opaque layer 168 in a similar manner as the grooves and/or raised portions 37 are imposed in the surface 35 of the sheet 32. After the surface 170 of the opaque layer 68 is textured and cleaned, the coating 40 is applied to the textured surface 172 of the opaque layer 168.

In the non-limiting embodiment of the coated article 166 of the invention shown in FIG. 7, like the non-limiting embodiment of the invention of the coated article 154 shown in FIG. 6, the textured surface 172 of the article 166 shown in FIG. 7 is viewed through the coating 40. As is appreciated, because the coated article 172 is viewed through the coating 40, outer surface 180 of the coated articles 154 and 166 have to be protected from the environment, cleaning solution and physical contact. The discussion of protecting the surface of the coated articles is presented in detail below.

Examples

Non-limiting embodiments of the present invention is illustrated by the following examples. Two, 4 inch×4 inch×0.079 inch thick pieces of Starphire® glass were cut to make the two samples. Haze measurements were taken for each, untreated (unscratched) sample using a TCS spectrophotometer commercially available from BYK Gardner.

A surface of both samples was abraded using a ShopPro 25 Drum Sander commercially available from Performax Products, Inc. (MN). Silicon carbide-impregnated nylon mesh abrasive pads commercially available from McMaster-Carr Supply (GA) were wrapped around the cylindrical drum sander.

Each of the samples was passed through the described drum sander with the axis of the drum sander offset at an angle of approximately 81° relative to the direction of conveyer movement. The axis of the drum sander was offset to avoid having the scratches on the surface continuous from the leading edge to the trailing edge of the samples. The position of the abrasive pads was visually set to ensure uniform contact between the abrasive pad and the surface of the samples to be abraded as the samples move passed the rotating drum sander.

The drum sander was rotated at a speed 1125 feet/minute and the speed of the conveyer was 5.3 feet/minute. Each sample was moved past the drum sander in the same orientation twenty times. The samples were then washed and dried, and the texturized or abraded surface of each sample measured for haze as described above. The recorded haze data is shown in Table 2 below.

TABLE 2

Haze Measurements of the Exemplary Substrates

|  | % Haze | Delta % Haze |
|---|---|---|
| Ex. 1 |  | 12.32 |
| Unscratched | 0.08 |  |
| Scratched | 12.40 |  |
| Ex. 2 |  | 11.74 |
| Unscratched | 0.06 |  |
| Scratched | 11.80 |  |

As can now be appreciated, in one non-limiting embodiment transparent sheets or substrates having a textured surface according to the present invention will have a Delta % haze of at least 10%. The invention contemplates texturizing the surface of the sheet to provide the sheet with a textured surface and a Delta % haze of greater than 0%, e.g. at least 15%, or at least 25%, or in the range of 5-50%, or in the range of 5-25%, or in the range of 8-25%, depending on the desired textured appearance of the coated article of the invention.

The invention is not limited to the optical performance of the coated articles or components of the coated articles of the invention, e.g. the visible light transmission and reflection of the sheet, e.g. the sheet 32, the visible light transmission and reflection of the coating, e.g. the coating 40, and the color of the coated article, e.g. the coated article 30. The optical performance is selected depending on the desired use of the coated article. By way of illustration and not limiting to the invention, when the coated article is used as a window, the visible light transmission of the coated article is at least 5%, e.g. at least 10%. When it is desired to use the coated article 30 as a two way mirror, one surface, e.g. the surface 35, has a higher visible light reflectance that the opposite surface, e.g. the surface 34.

Figure 8:
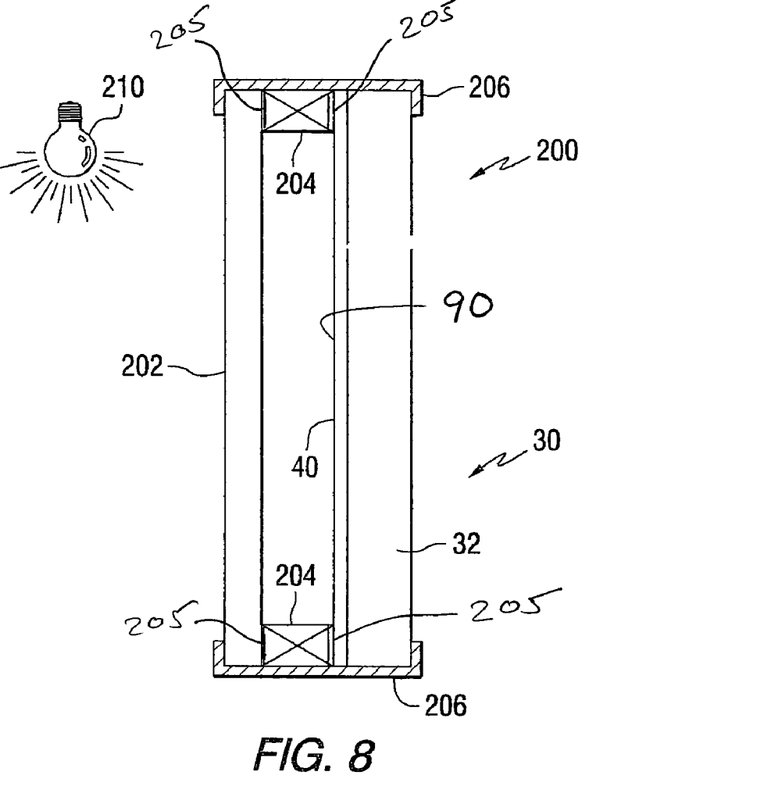
FIG. 8 is an elevated side view partially in cross-section showing a window unit having a non-limiting embodiment of a coated article of the invention.

In the non-limiting embodiments of the invention discussed above, the protective overcoat was used to protect the coating layer, e.g. the coating 40 in FIG. 2, against deterioration. The discussion is now directed to other non-limiting embodiments of the invention to protect the coating. With reference to FIG. 8, there is shown another non-limiting embodiment of the invention to protect the coating 40. More particularly, window unit 200 includes one of the non-limiting embodiments of the coated article of the invention, e.g. but not limited to the coated article 30, spaced from a glass sheet 202 by a spacer frame 204 to form an insulating glazing unit of a type well know in the art. The sheet 202 and coated article 30 are held together against the spacer frame 204 in any convenient manner, e.g. but not limiting to invention by an adhesive 205 and/or a metal tape 206. The window unit 200 can be used as a window for commercial and/or residential buildings, partitions for dividing large rooms or offices, and windows or doors for appliances.

In another non-limiting embodiment of the invention, the window unit 200 is a window of an appliance (the appliance not shown), e.g. a window of an oven or microwave door. The surface 90 of the coating 40 faces the exterior of the appliance and has a higher percent of visible reflection than the coated surface 90 facing the interior of the appliance. The coating 40 is preferably a transparent, low emissivity coating. With this arrangement, the textured surface is observed when the door of the appliance is closed and interior light 210 of the appliance turned off. The interior of the appliance can be seen with the door closed and the interior light 210 turned on, and the heat of the appliance interior is reflected back into the appliance interior by providing that the coating 40 is a low emissivity coating 40.

Figure 9:
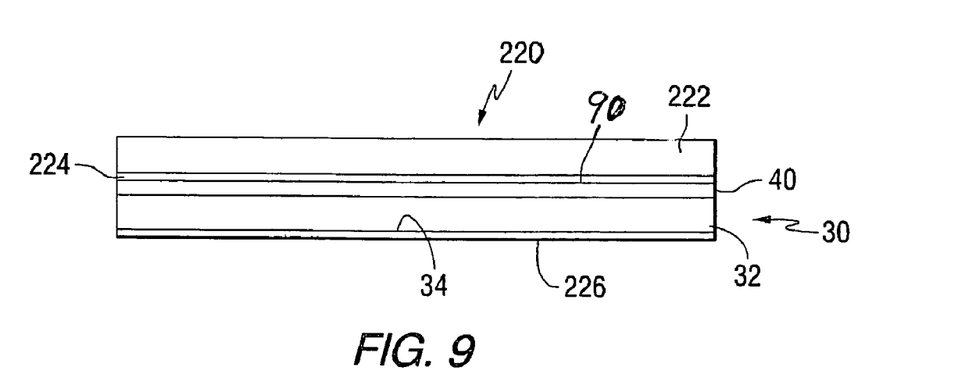
FIG. 9 is an elevated side view of a laminated window unit having a non-limiting embodiment of a coated article of the invention.

With reference to FIG. 9, there is shown another non-limiting embodiment of the invention to protect the coating, e.g. the coating 40. Laminated unit 220 of FIG. 9 includes a glass or plastic sheet 222 joined to the outer surface 90 of the coated article 30 by a plastic interlayer sheet 224. The laminated unit 220 shown in FIG. 9 can be a vehicular window, e.g. an automotive windshield, back window, side window, or roof window.

As can be appreciated, a coating or film 226 can be provided over one or both of the outer surfaces of the laminated unit 220 (only shown on the surface 34 of sheet 32 of the coated article 30 in FIG. 9), e.g. and not limiting to the invention, a photocatalytic film or water reducing film, e.g. of the type disclosed in U.S. Pat. No. 5,873,203; U.S. Pat. No. 6,027,766; and U.S. Pat. No. 6,027,766, which disclosures are hereby incorporated by reference.

It can be readily appreciated by those skilled in the art that modifications can be made to the invention without departing from the concepts disclosed in the foregoing description. Such modifications are to be considered as included within the scope of the invention. Accordingly, the particular embodiments described in detail hereinabove are illustrative only and are not limiting as to the scope of the invention, which is to be given the full breadth of the appended claims and any and all equivalents thereof.

What is claimed is:

1. An article having a metallic appearance, the article comprising:
 a non-metal substrate having a first major surface and an opposite second major surface, the second major surface having a textured surface to provide the second surface of the substrate with a predetermined pattern, wherein the predetermined pattern comprises one or more grooves having a length up to 5 centimeters, a width ranging from 1-100 microns and a depth ranging from 0.05-1 microns on the second surface of the substrate; and a coating having a first surface and an opposite second surface with the first surface of the coating over at least a portion of the second surface of the substrate and in surface contact with the predetermined pattern to conform portions of the first surface of the coating to corresponding portions of the predetermined pattern, wherein percent visible light transmittance, and percent visible light reflectance of the substrate having the coating is selected such that the predetermined pattern is visible when the article is viewed through the first surface of the substrate, or is visible when the article is viewed through the second surface of the coating.

2. The article according to claim 1, wherein the article is an article of manufacture selected from the group consisting of furniture, appliances, windows for commercial and residential buildings, and a vehicle part.

3. The article according to claim 1, wherein the coated article has a visible light reflectance in the range of 40.2-67.2%.

4. The article according to claim 1, wherein the overlay is a coating.

5. The article according to claim 1, wherein the substrate is selected from the group consisting of glass, plastic and combinations thereof.

6. The article according to claim 5, wherein the coating provides the article with a metallic appearance.

7. The article according to claim 6, wherein the coating comprises an aesthetic reflective layer of one or more metals, metal alloys and mixtures thereof.

8. The article according to claim 7, wherein the aesthetic reflective layer has a thickness in the range of 1 to 20 nanometers ("nm").

9. The article according to claim 7, wherein the coating is a magnetically sputtered vacuum deposited, heatable coating, and the coating further comprises a primer layer over the aesthetic reflective layer, a dielectric layer over the primer layer and a protective overcoat over the dielectric layer.

10. The article according to claim 9, wherein the primer layer is on the aesthetic reflective layer and has a thickness in the range of 1 to 10 nm, the dielectric film is on the primer layer and has a thickness in the range of 1 to 10 nm, and the protective overcoat is on the dielectric layer and has a thickness in the range of 10 to 500 nm.

11. The article according to claim 9, wherein the aesthetic reflective layer is selected from the group consisting of steel, copper, brass, niobium, aluminum, nichrome, tin, nickel, and chrome, noble metals and mixtures thereof, the primer film is selected from titanium containing material, a zirconium containing material, an aluminum containing material, a nickel containing material, a chromium containing material, a hafnium containing material, a copper containing material, a niobium containing material, a tantalum containing material, a vanadium containing material, an indium containing material, a zinc containing material, and mixtures thereof; the dielectric layer is a metal oxide, wherein the metal of the metal oxide is selected from the group consisting of titanium, hafnium, zirconium, niobium, zinc, bismuth, lead, indium, tin, zinc and tin, oxides of indium-tin alloys, silicon nitrides, silicon aluminum nitrides, oxynitrides, and aluminum nitrides; and the protective layer is an oxide of a mixture of silica and alumina.

12. The article according to claim 6, wherein the coating is a heatable coating having a low emissivity and comprises a layer of a visible light absorbing material over one of the surfaces of the substrate; a first dielectric layer over the layer of the visible light absorbing material; a first silver layer over the first dielectric layer; a first primer layer over the first silver layer; a second dielectric layer over the first primer layer; a second silver layer over the second dielectric layer; a second primer layer over the second silver film; a third dielectric layer over the second primer layer; and a protective overcoat over the dielectric layer.

13. The article according to claim 12, wherein the coated article has color coordinates according to the CIE 1976 standard with illuminant D65 at a 10% observer angle of $a^*=0.3$, $b^*=4.5$, and $L^*=78$, wherein the listed color coordinates can vary by ±10%.

14. The article according to claim 13, wherein first surface of the layer of the visible light absorbing material is the first surface of the overlay and has a thickness in the range of 2 to 10 nm; the first dielectric layer is on an opposite second surface of the layer of visible light absorbing material and has a thickness in the range of 30 to 50 nm; the first silver layer is on the first dielectric layer and has a thickness in the range of 10 to 100 nm; the first primer layer is on the first silver layer and has a thickness in the range of 1 to 6 nm; the second dielectric layer is on the first primer layer and has a thickness in the range of 30 to 50 nm; the second silver layer is on the second dielectric layer and has a thickness in the range of 10 to 100 nm; the second primer layer is on the second silver layer and has a thickness in the range of 1 to 6 nm; a third dielectric layer is on the second primer layer and has a thickness in the range of 30 to 50 nm; and a protective overcoat is on the third dielectric layer and has a thickness in the range of 10 to 500 nm.

15. The article according to claim 14, wherein the visible light absorbing material is selected from the group consisting of titanium nitride, nickel, chrome, and mixtures thereof.

* * * * *